(12) United States Patent
Kobayashi et al.

(10) Patent No.: US 9,862,342 B2
(45) Date of Patent: Jan. 9, 2018

(54) VEHICULAR EMERGENCY ALERT DEVICE

(71) Applicant: MAZDA MOTOR CORPORATION, Hiroshima (JP)

(72) Inventors: Masahiro Kobayashi, Hiroshima (JP); Kengo Iwata, Hiroshima (JP); Masanobu Kosaka, Kure (JP); Hikari Arimi, Hiroshima (JP); Risa Fujita, Kure (JP); Yoshikata Kimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/024,172

(22) PCT Filed: Jun. 2, 2015

(86) PCT No.: PCT/JP2015/002794
§ 371 (c)(1),
(2) Date: Mar. 23, 2016

(87) PCT Pub. No.: WO2015/194109
PCT Pub. Date: Dec. 23, 2015

(65) Prior Publication Data
US 2016/0236639 A1 Aug. 18, 2016

(30) Foreign Application Priority Data

Jun. 17, 2014 (JP) .................. 2014-124505

(51) Int. Cl.
*G07C 5/00* (2006.01)
*B60R 21/0136* (2006.01)
(Continued)

(52) U.S. Cl.
CPC ........ *B60R 21/0136* (2013.01); *B60R 16/023* (2013.01); *B60R 16/0207* (2013.01);
(Continued)

(58) Field of Classification Search
USPC ... 701/31.4, 31.5, 36, 45, 49, 301, 515, 519; 280/734, 735; 180/271, 274, 281;
(Continued)

(56) References Cited

U.S. PATENT DOCUMENTS 5,338,062 A * 8/1994 Kiuchi ................ B60R 21/0132
  180/274
5,574,315 A * 11/1996 Weber ................... E05B 377/12
  180/271
(Continued)

FOREIGN PATENT DOCUMENTS

JP  H02-011972 U   1/1990
JP  2001-155281 A  6/2001
(Continued)

OTHER PUBLICATIONS

International Search Report of PCT/JP2015/002794 dated Aug. 4, 2015.
Written Opinion of PCT/JP2015/002794 dated Aug. 4, 2015.

*Primary Examiner* — Jonathan M Dager
*Assistant Examiner* — Richard A Goldman
(74) *Attorney, Agent, or Firm* — Studebaker & Brackett PC (57) ABSTRACT

A vehicular emergency alert device mounted on a vehicle (100) and configured to issue an emergency alert signal to notify an emergency service center outside the vehicle of a location of the vehicle in the event of a collision of the vehicle includes: a collision detecting unit (11) that detects the collision of the vehicle (100) to output a collision detection signal; an emergency alert unit (13) that issues an emergency alert signal in response to the collision detection signal and relays the collision detection signal to the vehicle; and one or more modules (12) each of which performs a
(Continued)

predetermined operation in response to the collision detection signal relayed by the emergency alert unit (13).

12 Claims, 7 Drawing Sheets

(51) Int. Cl.
  *B60R 16/02* (2006.01)
  *B60R 16/023* (2006.01)
  *E05B 81/06* (2014.01)
  *G08B 25/01* (2006.01)
  *B60R 16/03* (2006.01)
  *B60R 21/00* (2006.01)
  *G08B 25/08* (2006.01)

(52) U.S. Cl.
  CPC .............. *B60R 16/03* (2013.01); *E05B 81/06* (2013.01); *G08B 25/016* (2013.01); *B60R 2021/0027* (2013.01); *G08B 25/08* (2013.01)

(58) Field of Classification Search
  USPC ................ 342/457; 340/425.5, 436, 989
  See application file for complete search history.

(56) References Cited

U.S. PATENT DOCUMENTS

| | | | | |
|---|---|---|---|---|
| 5,969,598 A * | 10/1999 | Kimura | .................... | B60R 21/01 180/274 |
| 6,266,617 B1 * | 7/2001 | Evans | .................... | G08G 1/205 340/436 |
| 6,310,543 B1 * | 10/2001 | Yoshioka | ............. | G08B 25/016 340/426.2 |
| 6,427,106 B1 * | 7/2002 | Kimura | .................... | B60R 21/01 180/268 |
| 6,480,784 B2 * | 11/2002 | Mizuno | .................. | G01C 21/26 342/357.31 |
| 6,490,513 B1 * | 12/2002 | Fish | ....................... | G07C 5/008 340/439 |
| 6,690,302 B1 * | 2/2004 | Inomata | ............... | G08B 25/016 340/426.2 |
| 7,607,510 B1 * | 10/2009 | Mun | .................... | B60R 21/0132 180/274 |
| 8,744,412 B1 * | 6/2014 | Cazanas | .................. | H04W 4/12 340/426.1 |
| 2001/0007963 A1 * | 7/2001 | Ugusa | ................ | B60R 21/0132 701/49 |
| 2002/0032510 A1 * | 3/2002 | Turnbull | ................... | B60R 1/12 701/49 |
| 2002/0169535 A1 * | 11/2002 | Imai | .................... | B60R 21/0132 701/45 |
| 2004/0148082 A1 * | 7/2004 | Imai | ...................... | B60R 21/013 701/45 |
| 2005/0057344 A1 * | 3/2005 | Davis | .................... | G08G 1/205 340/425.5 |
| 2005/0240331 A1 * | 10/2005 | Nowak | ................ | E05L 351/023 701/49 |
| 2005/0264403 A1 * | 12/2005 | Nobusawa | ........... | G08B 25/016 340/436 |
| 2006/0041513 A1 * | 2/2006 | Yuhara | .................... | B60R 25/04 705/59 |
| 2006/0135170 A1 * | 6/2006 | Patenaude | ........... | H04W 76/028 455/450 |
| 2010/0273446 A1 * | 10/2010 | Stahlin | .................. | G01S 5/0036 455/404.2 |
| 2010/0317337 A1 * | 12/2010 | Chakam | ............... | H01Q 1/3241 455/422.1 |
| 2011/0210867 A1 * | 9/2011 | Benedikt | .................. | G08G 1/01 340/905 |
| 2012/0015636 A1 * | 1/2012 | Monig | ............... | G05B 23/0218 455/414.1 |
| 2012/0094628 A1 * | 4/2012 | Mader | .................... | G08G 1/205 455/404.1 |
| 2012/0259499 A1 * | 10/2012 | Hiraoka | .............. | B60R 21/013 701/29.1 |
| 2013/0006469 A1 * | 1/2013 | Green | .................... | G07C 5/008 701/36 |
| 2014/0094210 A1 * | 4/2014 | Gellens | .................. | H04W 4/12 455/517 |
| 2014/0330465 A1 * | 11/2014 | Matsudaira | ........... | B60W 20/00 701/22 |
| 2014/0358378 A1 * | 12/2014 | Howard | ................. | B60N 2/501 701/45 |
| 2015/0051789 A1 * | 2/2015 | Wanami | ............... | G07C 5/0841 701/32.2 |
| 2015/0283968 A1 * | 10/2015 | Nakamura | .......... | B60R 21/0136 340/436 |
| 2015/0348337 A1 * | 12/2015 | Choi | ........................ | G07C 5/08 701/31.5 |
| 2016/0042767 A1 * | 2/2016 | Araya | ................... | G11L 319/02 386/201 |
| 2016/0236639 A1 * | 8/2016 | Kobayashi | ........... | G08B 25/016 |
| 2016/0267325 A1 * | 9/2016 | Sundaresan | ........ | G06K 9/00624 |
| 2016/0325702 A1 * | 11/2016 | Nakamura | .......... | B60R 21/0132 |

FOREIGN PATENT DOCUMENTS

| | | |
|---|---|---|
| JP | 2003-097123 A | 4/2003 |
| JP | 2010-288198 A | 12/2010 |
| JP | 2013-109752 A | 6/2013 |
| RU | 2298494 C1 | 5/2007 |
| RU | 69661 U1 | 12/2007 |
| WO | 02/08021 A1 | 1/2002 |

* cited by examiner

VEHICULAR EMERGENCY ALERT DEVICE

TECHNICAL FIELD

The present disclosure relates to a vehicular emergency alert device for, for example, an automobile, and particularly to a vehicular emergency alert device that issues an emergency alert signal in the event of a collision of a vehicle.

BACKGROUND ART

In the event of a vehicle collision, locked doors hinder rescue of a passenger in the vehicle. In view of this, a technique for automatically unlocking the doors by operating a door actuator in the event of a collision is proposed (see Patent Document 1).

In another proposed technique, in a case where a serious collision such as a collision involving air bag expansion occurs, occurrence of the accident and an accurate location of the vehicle are automatically reported to a nearest emergency service center (see Patent Document 2). In Eurasian Economic Commission (EEC), equipment with such emergency alert function in a vehicle is expected to be made mandatory prior to other countries.

CITATION LIST

Patent Document

PATENT DOCUMENT 1: Japanese Utility Model Publication No. 2-11972
PATENT DOCUMENT 2: Japanese Patent Publication No. 2013-109752

SUMMARY OF THE INVENTION

Technical Problem

In a vehicle having both the function of automatically unlocking the doors and the function of automatic emergency alert, a door unlock signal for automatically unlocking the doors can be used as a trigger signal for issuing an emergency alert signal in some cases. The door unlock signal is, for example, output from an air bag control unit (SAS) for expanding an air bag when detecting a vehicle collision, and is supplied to a module (BCM) divided into two branches at an output terminal of the SAS and to a data communication module (DCM) for issuing an emergency alert signal.

The SAS is required of being operable even in the event of a vehicle accident. Thus, the SAS is disposed in a center portion of an under body having a high rigidity and not susceptible to damage even in the case of a serious vehicle accident. The DCM is also disposed near the SAS in the center portion of the under body. On the other hand, the BCM, which needs to control locking/unlocking of doors around the entire periphery of the vehicle, is disposed away from the SAS, for example, disposed in a rear portion of the vehicle. Because of such arrangement, a door unlock signal is transmitted from the SAS to the BCM through a wire harness drawn along a side sill in some cases.

Such a long wire harness, for example, might be broken or grounded in the event of a collision of the vehicle, especially a side collision.

In view of the foregoing problems, the present disclosure provides a vehicular emergency alert device ensuring an issue of an emergency alert signal in the event of a collision of a vehicle.

Solution to the Problem

A vehicular emergency alert device according to an aspect of the present disclosure is a vehicular emergency alert device mounted on a vehicle and configured to issue an emergency alert signal to notify an emergency service center outside the vehicle of a location of the vehicle in an even of a collision of the vehicle, and includes: a collision detecting unit that detects the collision of the vehicle to output a collision detection signal; an emergency alert unit that issues the emergency alert signal in response to the collision detection signal, and relays the collision detection signal to the vehicle; and one or more modules each of which performs a predetermined operation in response to the collision detection signal relayed by the emergency alert unit.

In this configuration, the collision detection signal output from the collision detecting unit is relayed by the emergency alert unit and transmitted to other modules. Thus, even in a case where the wire harness connecting the emergency alert unit to the modules is grounded in the event of a collision of the vehicle so that the collision detection signal relayed by the emergency alert unit fails to be transmitted to the modules, the emergency alert unit can receive the collision detection signal from the collision detecting unit without an influence of the grounding on the wire harness between the collision detecting unit and the emergency alert unit.

In the vehicular emergency alert device, the collision detecting unit and the emergency alert unit are disposed close to each other in a center portion of an under body of the vehicle, and the one or more modules are disposed at a plurality of locations in the vehicle.

In this configuration, the collision detecting unit and the emergency alert unit are disposed in the center portion of the under body having a high rigidity. Thus, even in the event of a collision of the vehicle, the collision detecting unit and the emergency alert unit are not damaged so that an emergency alert signal can be issued. In addition, since the modules that are not directly related to an issue of the emergency alert signal are disposed at various locations of the vehicle near a control target, the wire harness between the modules and the control target can be shortened.

Specifically, in the vehicular emergency alert device, at least one of the one or more modules is a door lock control module disposed in a rear portion of the vehicle and configured to unlock a door of the vehicle in response to the collision detection signal, and a wire harness that transmits the collision detection signal relayed by the emergency alert unit to the door lock control module extends along a side sill of the vehicle.

Advantages of the Invention

According to the present disclosure, an emergency alert signal can be issued without fail in the event of a collision of a vehicle.

DESCRIPTION OF EMBODIMENTS

Embodiments for carrying out the disclosure will be described hereinafter with reference to the drawings. The present disclosure is not limited to the following embodiments.

First Embodiment

Figure 1:
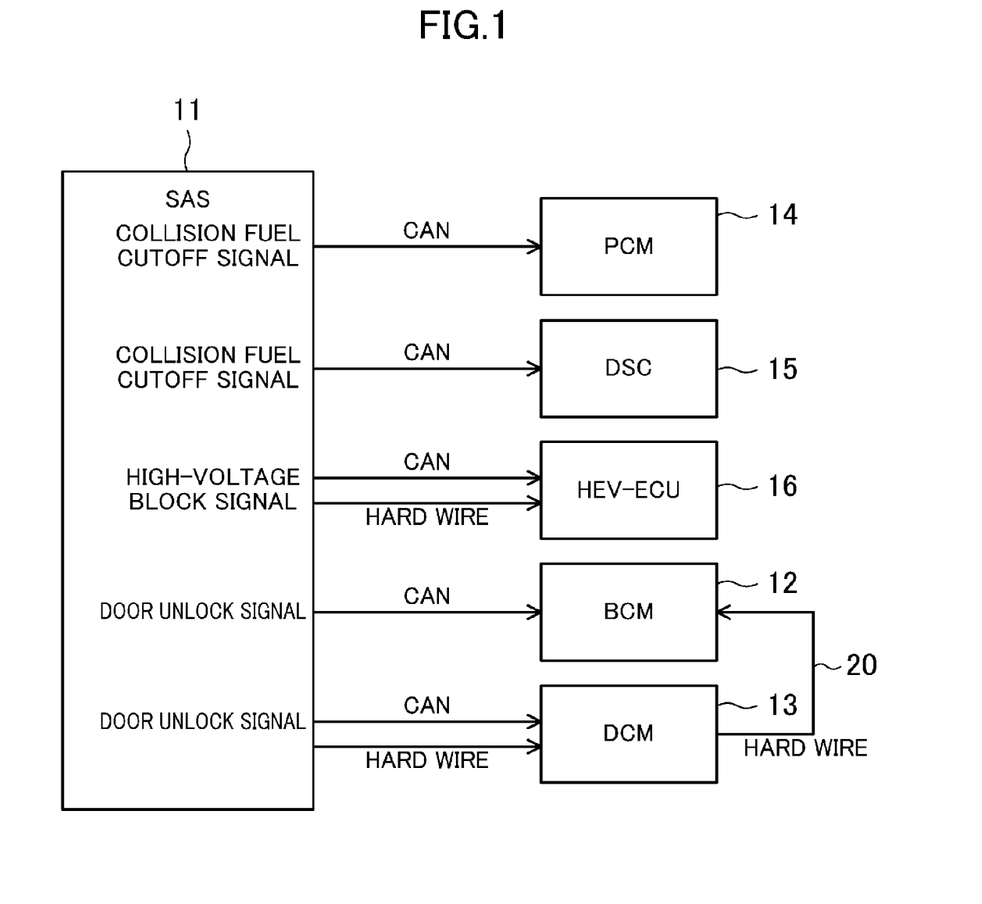
FIG. 1 is an electrical system diagram illustrating a vehicular emergency alert device according to a first embodiment of the present disclosure and modules related to the vehicular emergency alert device.

FIG. 1 is an electrical system diagram illustrating a vehicular emergency alert device according to a first embodiment of the present disclosure and modules related to the vehicular emergency alert device. The vehicular emergency alert device according to the first embodiment is mounted on a vehicle (vehicle 100 illustrated in FIGS. 5 and 6), and in the event of a collision of the vehicle, issues an emergency alert signal to notify an emergency service center outside the vehicle of the location of the vehicle.

The vehicular emergency alert device of the first embodiment includes, as main components, an air bag control unit (SAS) 11, a door lock control module (BCM) 12, and a data communication module (DCM) 13.

The SAS 11 is a device that detects a collision of the vehicle to expand an air bag provided in each seat in the vehicle. More specifically, the SAS 11 receives an impact signal, such as an acceleration waveform, from an unillustrated impact sensor for detecting an impact applied to the vehicle, and determines whether a collision of the vehicle occurs or not based on the impact signal. If it is determined that a collision occurs, the air bag is expanded. When detecting a collision of the vehicle, the SAS 11 outputs a collision detection signal such as a door unlock signal or a collision fuel block signal to each module.

The BCM 12 controls an operation of the door actuator (door lock motor 102 illustrated in FIG. 5), and locks or unlocks each door of the vehicle. The BCM 12 is disposed in a rear portion of the vehicle in some cases. In such cases, the BCM 12 controls, for example, a tail lamp and a rear wiper (stop lamp 103 and the rear wiper 104 of the vehicle illustrated in FIG. 5).

The BCM 12 receives a door unlock signal as a collision detection signal from the SAS 11, and thus, operates the door actuator to cancel the door lock. More specifically, when the BCM 12 receives a door unlock signal from the SAS 11 at an ignition-on of the vehicle, the BCM 12 operates the door actuator to unlock the doors. The BCM 12 tries an operation of the door actuator a plurality of times (e.g., three times). This is because in some situations of collision, the doors cannot be unlocked only a single control.

The DCM 13 includes a current position detecting function for detecting a current position of the vehicle, such as a global positioning system (GPS) installed in, for example, a navigation system, and a communication function for notifying an emergency service center outside the vehicle of emergency information. The DCM 13 receives a door unlock signal as a collision detection signal from the SAS 11, and thereby, issues an emergency alert signal that notifies the emergency service center outside the vehicle of a precise location of the vehicle. As described above, the BCM 12 and the DCM 13 use the door unlock signal as a common collision detection signal.

A power train control module (PCM) 14 is a device for controlling a vehicle speed and an automatic transmission. A brake control module (DSC) 15 is a device that automatically controls power of a brake or an engine and obtains stability of the vehicle in order to reduce a side slip of the vehicle caused by a sudden steering in, for example, running on a slippery road or an emergency detour. The PCM 14 and the DSC 15 receive a collision fuel block signal as a collision detection signal from the SAS 11, stop the engine by stopping a fuel supply to the engine, and brake the vehicle with stability by controlling a brake.

In a hybrid vehicle having two power sources of an engine and an electric motor, a module (HEV-ECU) 16 for controlling a hybrid engine is mounted on a vehicle. In the event of a collision of the vehicle, the HEV-ECU 16 receives a high-voltage block signal as a collision detection signal from the SAS 11, and thereby, blocks a high voltage from a capacitor to an electric motor to prevent a passenger from receiving an electric shock.

The SAS 11 and the modules are connected to an in-vehicle bus (CAN) and can transmit/receive data to/from each other with serial communication. However, the CAN is readily broken at a serious vehicle accident, such as a collision, and might fail to be used for data transfer. Thus, the BCM 12, the DCM 13, and the HEV-ECU 16, for example, which are required of operating by receiving a collision detection signal without fail upon a collision, are configured to receive a collision detection signal directly using a wire harness (HARD WIRE) that is less likely to fail to communicate than the CAN. In this manner, the wire harness for detecting a collision for dedicated communication is provided in addition to the CAN so that emergency report can be made even at a vehicle accident. However, the wire harness might be broken or grounded in the event of a side collision, for example.

The DCM 13 directly receives a door unlock signal from the SAS 11 through the wire harness. The HEV-ECU 16 directly receives a high-voltage block signal from the SAS 11 through the wire harness. On the other hand, the BCM 12 receives a door unlock signal from the DCM 13 through the wire harness. In a conventional configuration, the door unlock signal is divided into two branches at the output terminal of the SAS 11 so that a door unlock signal is transferred from the SAS 11 to the BCM 12 and the DCM 13 through the wire harness. On the other hand, in the first embodiment, the DCM 13 relays the door unlock signal so that the door unlock signal is transferred from the DCM 13 to the BCM 12 through the wire harness 20.

Figure 2:
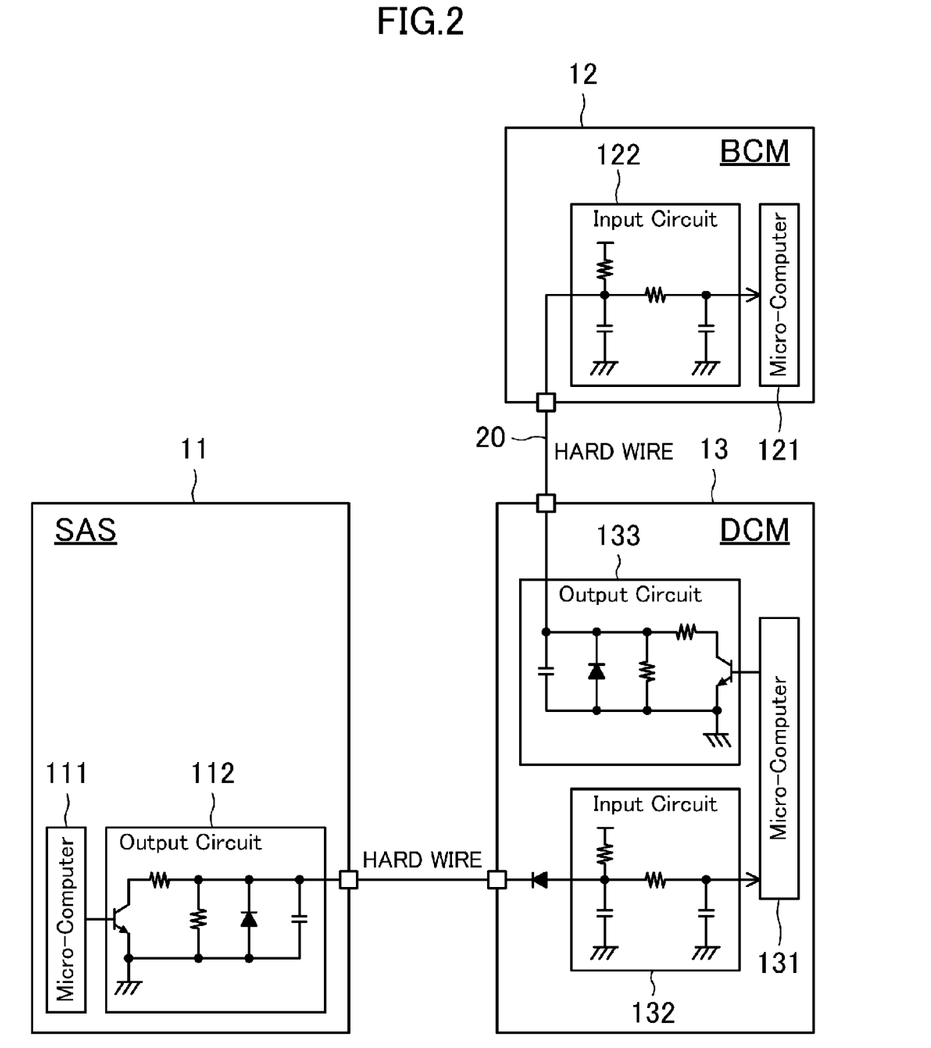
FIG. 2 is a circuit diagram illustrating input/output parts of a SAS, a DCM, and a BCM according to a first example.

Next, specific configurations of input/output parts of the SAS 11, the DCM 13, and the BCM 12 will be described using some examples. FIG. 2 is a circuit diagram illustrating input/output parts of the SAS 11, the DCM 13, and the BCM 12 in a first example.

The SAS 11 includes a micro-computer 111 and an output circuit 112. The micro-computer 111 is a control device responsible for expansion control of an air bag. The micro-computer 111 outputs a control signal of instructing an output of a door unlock signal when a collision of a vehicle is detected. The output circuit 112 is a transistor circuit, and drives a door unlock signal in accordance with a control signal output from the micro-computer 111 and outputs the door unlock signal to the outside.

The DCM 13 includes a micro-computer 131, an input circuit 132, and an output circuit 133. The micro-computer 131 is a control device responsible for issuing an emergency alert signal and control of a relay of a collision detection signal. The input circuit 132 inputs a door unlock signal (collision detection signal) received from the SAS 11 to the micro-computer 131. The output circuit 133 is constituted by a transistor circuit similar to the output circuit 112 of the SAS 11, and drives a new collision detection signal for a relay in accordance with a relay control signal output from the micro-computer 131, and outputs the new collision detection signal to the outside.

The BCM 12 includes a micro-computer 121 and an input circuit 122. The micro-computer 121 is a control device responsible for control of, for example, a door actuator, a tail lamp, and a rear wiper. The input circuit 122 is a circuit having a configuration similar to the input circuit 132 of the DCM 13, receives the collision detection signal relayed by the DCM 13, and inputs the signal to the micro-computer 121.

Figure 3:
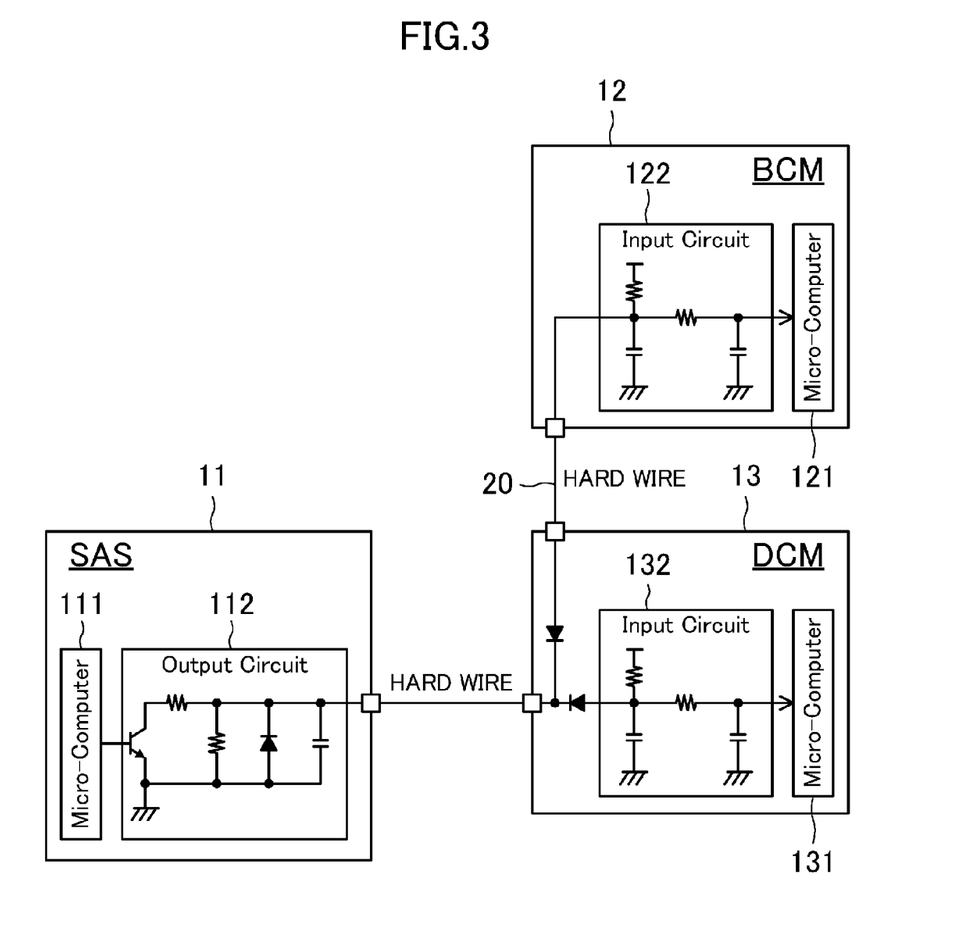
FIG. 3 is a circuit diagram illustrating input/output parts of a SAS, a DCM, and a BCM according to a second example.

FIG. 3 is a circuit diagram of input/output parts of a SAS 11, a DCM 13, and a BCM 12 in a second example. The circuit configurations of the SAS 11 and the BCM 12 are similar to those of the first example, and thus, description thereof will not be repeated.

The DCM 13 includes a micro-computer 131 and an input circuit 132, but does not include the output circuit 133 included in the DCM 13 of the first example. Unlike the first example, the micro-computer 131 does not output a relay control signal for controlling a relay of a collision detection signal. Instead, the DCM 13 divides a door unlock signal (collision detection signal) received from the SAS 11, and outputs the signal without change as a collision detection signal for a relay.

Figure 4:
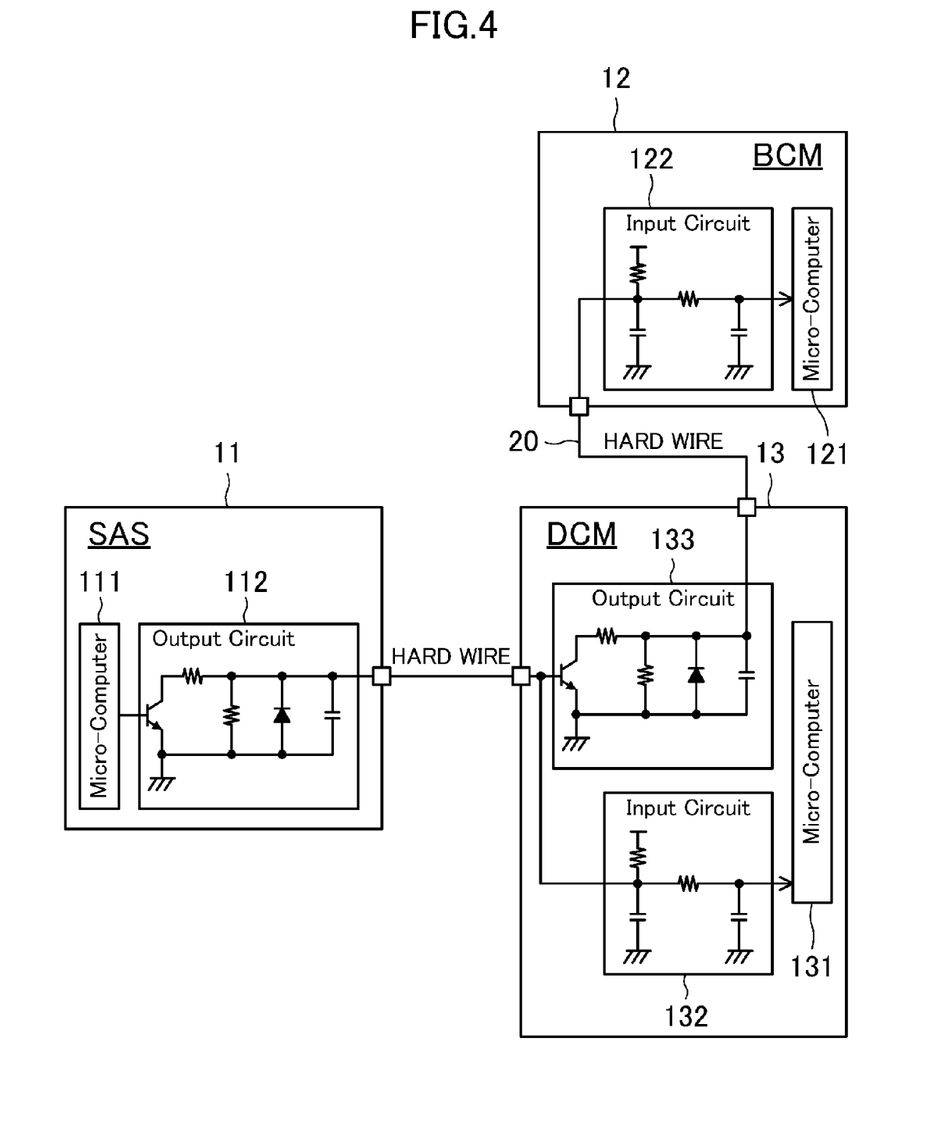
FIG. 4 is a circuit diagram illustrating input/output parts of a SAS, a DCM, and a BCM according to a third example.

FIG. 4 is a circuit diagram illustrating input/output parts of a SAS 11, a DCM 13, and a BCM 12 in a third example. The circuit configurations of the SAS 11 and the BCM 12 are similar to those of the first example, and thus, description thereof will not be repeated.

The DCM 13 includes a micro-computer 131, an input circuit 132, and an output circuit 133. Unlike the first example, the micro-computer 131 does not output a relay control signal for controlling a relay of a collision detection signal. Instead, the door unlock signal (collision detection signal) received by the SAS 11 is input as a control signal to the output circuit 133, and the output circuit 133 drives a new collision detection signal for a relay in accordance with the door unlock signal, and outputs the new collision detection signal to the outside.

A comparison among the first to third examples shows that the circuit configuration of the DCM 13 is simplest in the second example. However, note that in a case where the BCM 12 and the DCM 13 are disposed away from each other, the length of the wire harness 20 increases and, in the second example, a signal waveform of a collision detection signal output from the SAS 11, relayed by the DCM 13, and transmitted to the BCM 12 might be distorted. On the other hand, in the first and third examples, although the presence of the output circuit 133 makes the circuit configuration more complicated than that in the second example, a colli-sion detection signal for a relay is driven in the output circuit 133 and output to the outside, and thus, even when the length of the wire harness 20 increases to some degree, a collision detection signal having a distinct signal waveform can be transmitted to the BCM 12 advantageously. In addition, the first example has an advantage that the micro-computer 131 can control a relay of the collision detection signal.

Figure 5:
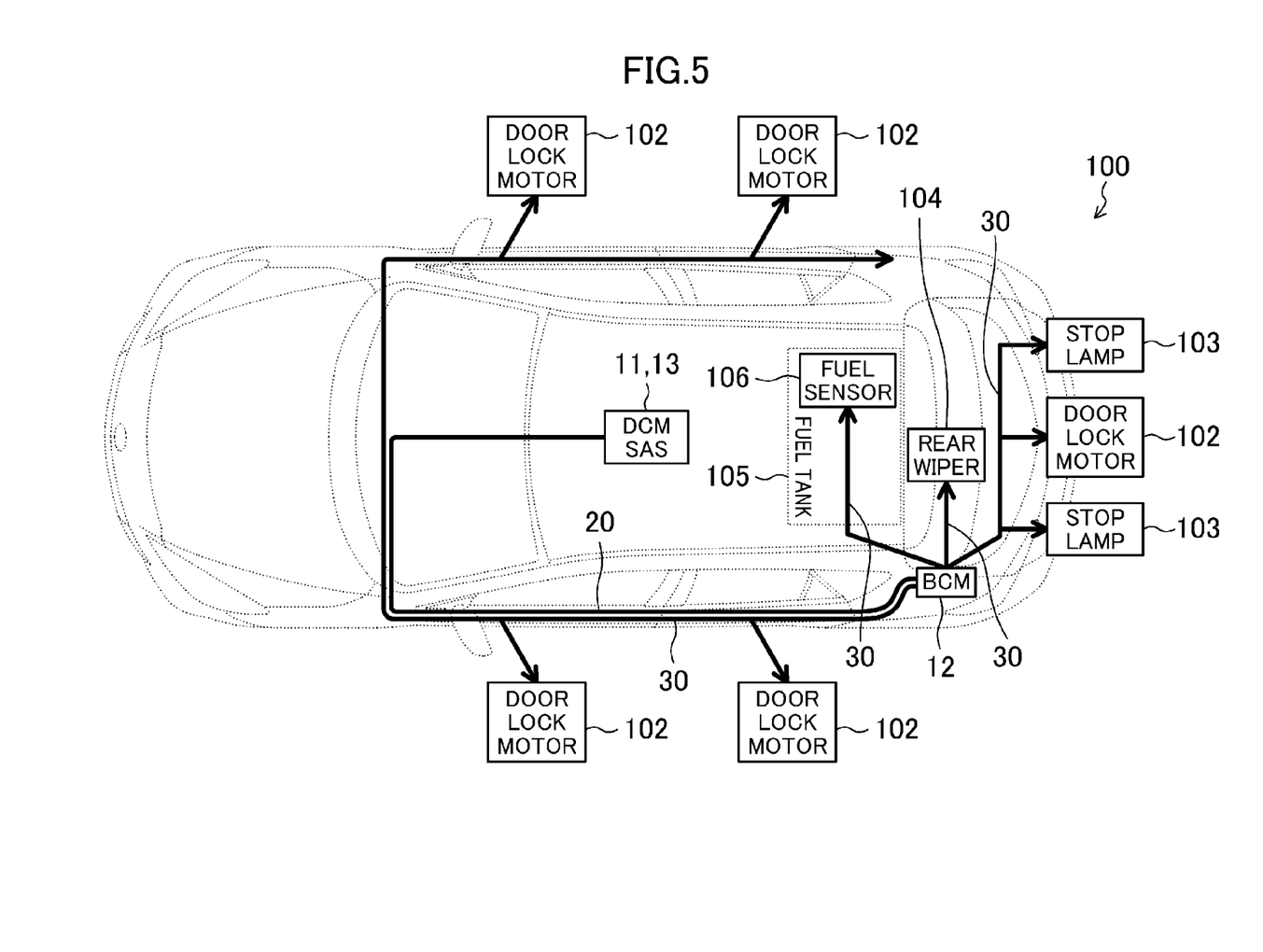
FIG. 5 is a top transparent view of a vehicle on which a vehicular emergency alert device is mounted.
Figure 6:
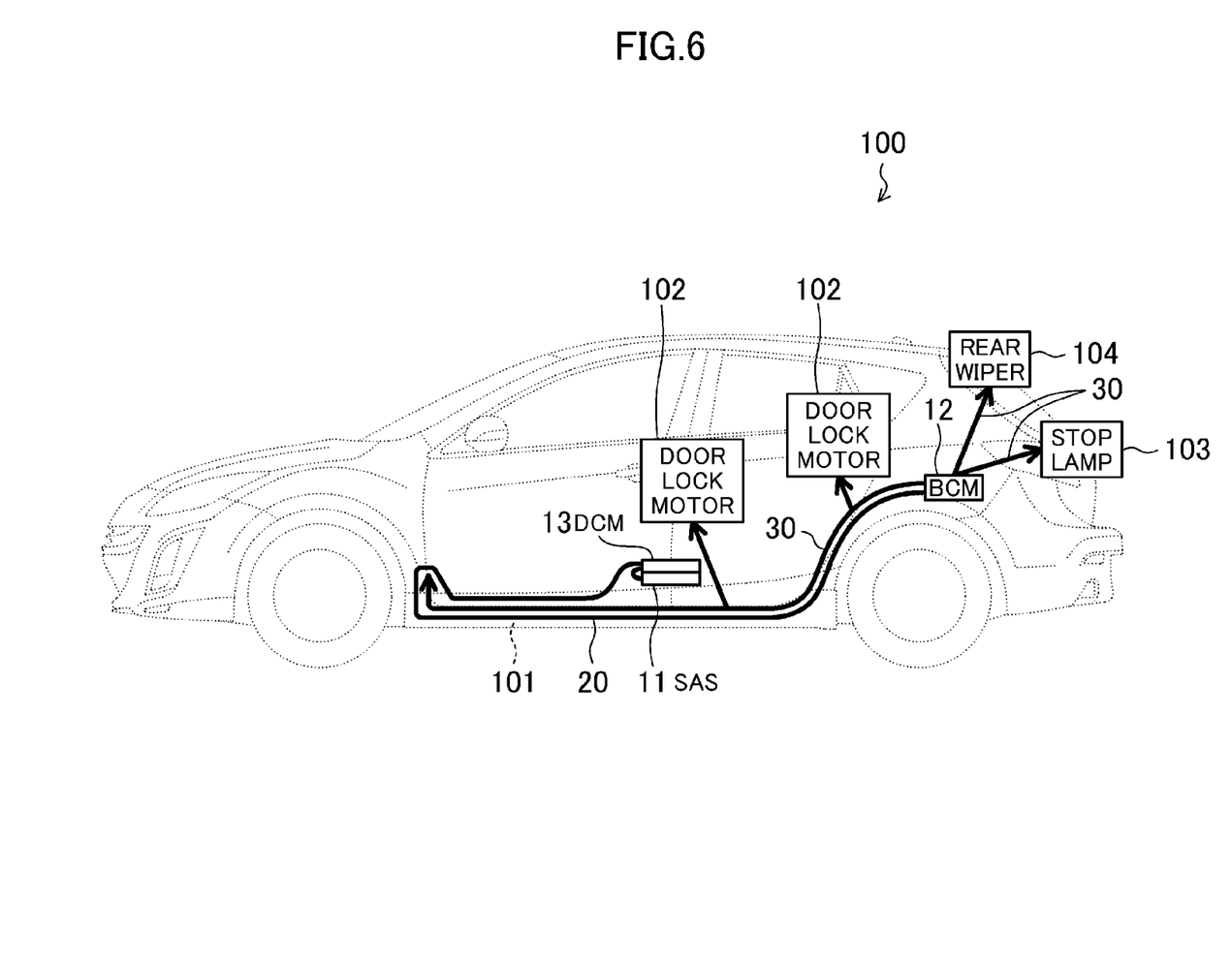
FIG. 6 is a left-side transparent view of the vehicle on which the vehicular emergency alert device is mounted.

Then, an example on-vehicle layout of the vehicular emergency alert device according to the first embodiment will be described. FIGS. 5 and 6 are a top transparent view and a left-side transparent view, respectively, of the vehicle 100 on which the vehicular emergency alert device according to the first embodiment is mounted. For convenience, in FIGS. 5 and 6, the vehicular emergency alert device of the first embodiment is indicated by solid lines, and a body and other components of the vehicle 100 are indicated by broken lines. The components of the vehicular emergency alert device according to the first embodiment are merely schematic illustration for description, and the shapes, sizes, and arrangements thereof can be different from those of actual components.

The vehicle 100 is a five-door hatchback, and the left in the drawings corresponds to the vehicle front, and the right in the drawings corresponds to the vehicle rear. The SAS 11 is disposed in a center portion of the under body of the vehicle 100. The under body of the vehicle 100 is made of a steel plate having a high rigidity, and a center portion thereof is not easily damaged even in the event of a collision. Thus, the SAS 11 that is a unit concerning safety of a passenger at a collision is preferably disposed in such a portion having a high rigidity.

Since the DCM 13 is a module that is important for a rescue request in the event of a collision, the DCM 13 is also preferably disposed in a portion of the vehicle having a high rigidity, in the same manner as the SAS 11. Thus, the DCM 13 is disposed close to the SAS 11 in the center portion of the under body of the vehicle 100, and is disposed above the SAS 11, for example. The SAS 11 and the DCM 13 are connected to the CAN, and as described above, are directly connected to each other by the wire harness 20 to transfer a door unlock signal as a collision detection signal from the SAS 11 to the DCM 13.

On the other hand, the BCM 12 is disposed at the left rear of the vehicle 100, that is, near an upper portion of a left rear fender. The BCM 12 controls an operation of the door actuator (door lock motor) 102, locks or unlocks each door of the vehicle 100, and controls the tail lamp (stop lamp) 103, the rear wiper 104, and the fuel sensor 106 in the fuel tank 105 in the vehicle 100.

The wire harness 20 extends from a center portion of the under body of the vehicle 100 where the SAS 11 and the DCM 13 are disposed to the front of the vehicle, is exposed at the left side surface of the vehicle along a dashboard, extends to the rear of the vehicle along the side sill 101 at the left of the vehicle, and reaches the BCM 12 disposed above the left rear fender. The door unlock signal relayed by the DCM 13 is transmitted to the BCM 12 through the wire harness 20 having such a long passage.

In addition, the wire harness 30 also extends from the BCM 12 to the door actuator 102, the tail lamp 103, the rear wiper 104, and the fuel sensor 106, for example. A part of the wire harness 30 is bundled together with the wire harness 20, and is disposed in the side sill 101 at the left of the vehicle.

The first embodiment can obtain the following advantages.

First, in the event of a collision, especially a side collision, of the vehicle 100, even when the wire harness 20 extending along the side sill 101 is grounded and a door unlock signal relayed by the DCM 13 is not transmitted to the BCM 12 anymore, the wire harness 20 between the SAS 11 and the DCM 13 can receive the door unlock signal (collision detection signal) from the SAS 11, without an influence of the grounding. In this manner, an emergency alert signal can be issued without fail in the event of a collision of the vehicle 100.

Second, since the SAS 11 needs to directly output a door unlock signal only to the DCM 13, the door unlock signal does not need to be divided into two branches at an output side of the SAS 11, unlike the conventional technique. In this manner, an internal circuit of the SAS 11 can be reduced.

Third, since the SAS 11 does not include an internal backup power supply, once a collision of the vehicle 100 occurs so that a battery disposed in an engine room is disconnected from the circuit, the SAS 11 cannot output a door unlock signal anymore. On the other hand, since the DCM 13 includes a backup power supply therein, the DCM 13 can operate for a relatively long time even after an external power supply has been stopped. Thus, this DCM 13 relays the door unlock signal so that it is possible to output the door unlock signal to the BCM 12 for a long period. In this manner, even when a battery in an engine room is detached in the event of a collision, the BCM 12 can continue to receive the door unlock signal and automatically unlocks the doors.

As described above, the BCM 12 is disposed at the left rear of the vehicle 100. Thus, the distance between the BCM 12 and each of the rear door, the rear wiper 104, and the stop lamp 103, for example, can be reduced. Thus, the total length of the wire harnesses 20 and 30 can be reduced in the entire vehicle, and cost reduction and vehicle weight reduction can be achieved.

Second Embodiment

Figure 7:
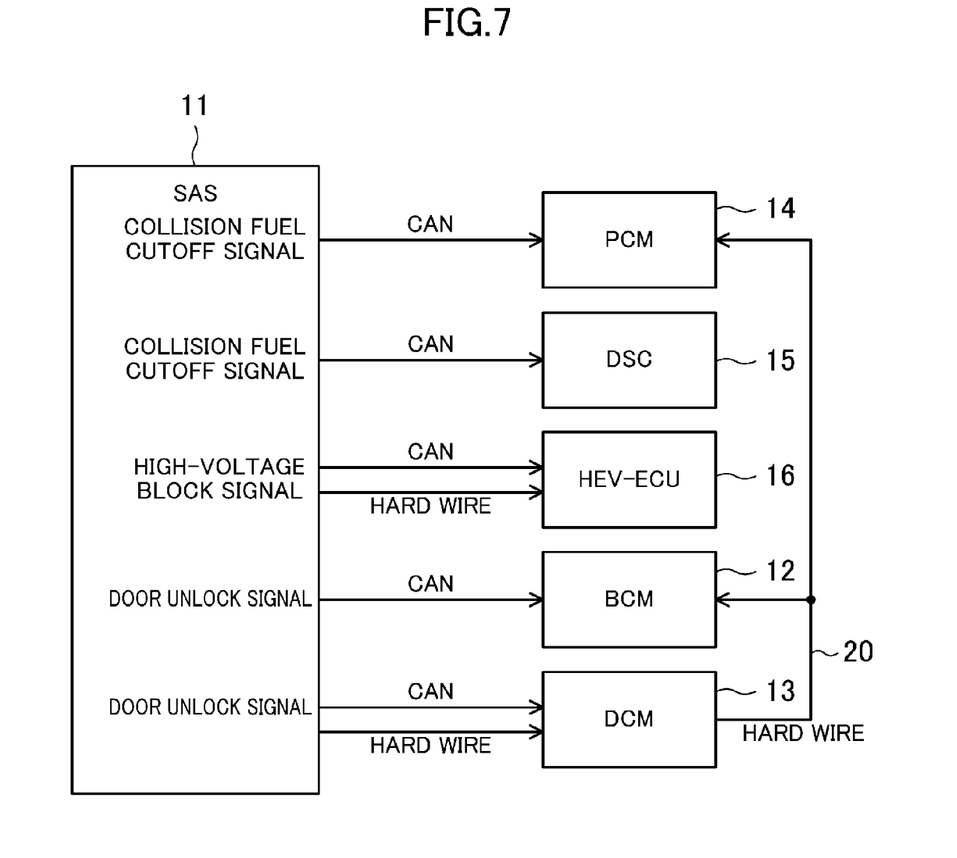
FIG. 7 is an electrical system diagram illustrating a vehicular emergency alert device according to a second embodiment of the present disclosure and modules related to the vehicular emergency alert device.

FIG. 7 is an electrical system diagram illustrating a vehicular emergency alert device according to a second embodiment of the present disclosure and modules related to the vehicular emergency alert device. In a case where a collision fuel block signal to be input to a PCM 14 can be substituted by a door unlock signal, a door unlock signal (collision detection signal) relayed by a DCM 13 can be directly connected to the PCM 14 through a wire harness 20, as in the second embodiment.

In the second embodiment, even in a case where the SAS 11 becomes out of operation because of a loss of a power supply in the event of a collision of the vehicle 100 or a case where the SAS 11 fails to transmit a collision fuel block signal to the PCM 14 because of breakage of a CAN, the PCM 14 receives a door unlock signal (collision detection signal) relayed by the DCM 13 and can stop a fuel supply to the engine to stop the engine and control the brake to brake the vehicle with safety.

Other Embodiments

In a case where a collision fuel block signal input to the DSC 15 can be substituted by a door unlock signal, a door unlock signal (collision detection signal) relayed by the DCM 13 can also be directly connected to the DSC 15 through the wire harness 20.

In the case where a high-voltage block signal input to the HEV-ECU 16 can be substituted by a door unlock signal, the door unlock signal (collision detection signal) relayed by the DCM 13 can also be directly connected to the HEV-ECU 16 through the wire harness 20.

Although embodiments of the present disclosure have been described, the present disclosure is not limited to the foregoing embodiments and can be variously modified.

The configurations of the embodiments described above with reference to FIGS. 1 through 7 are merely embodiments of the present disclosure and are not intended to limit the scope of the disclosure to the illustrated configurations.

DESCRIPTION OF REFERENCE CHARACTERS 10 vehicle
11 air bag control unit (SAS) (collision detecting unit)
12 door lock control module (BCM) (module)
13 data communication module (DCM) (emergency alert unit)
20 wire harness
101 side sill
131 micro-computer
132 input circuit
133 output circuit

The invention claimed is:

1. A vehicular emergency alert device mounted on a vehicle and configured to issue an emergency alert signal to notify an emergency service center outside the vehicle of a location of the vehicle in an event of a collision of the vehicle, the vehicular emergency alert device comprising:
   a collision detecting unit that detects the collision of the vehicle to output a collision detection signal;
   an emergency alert unit that issues the emergency alert signal in response to the collision detection signal; and
   one or more modules each of which automatically performs a predetermined operation in response to the collision detection signal, wherein
   the collision detecting unit outputs the collision detection signal into the emergency alert unit,
   the emergency alert unit outputs the collision detection signal into the one or more modules,
   at least one of the one or more modules is disposed in a rear portion of the vehicle, and
   the collision detecting unit and the emergency alert unit are disposed closer to a center portion of an under body of the vehicle than the one or more modules.

2. The vehicular emergency alert device of claim 1, wherein
   the collision detecting unit and the emergency alert unit are adjacent to each other in the center portion of the under body of the vehicle, and
   the one or more modules are disposed at a plurality of locations in the vehicle.

3. The vehicular emergency alert device of claim 2, wherein
   at least one of the one or more modules is a door lock control module disposed in the rear portion of the vehicle and configured to unlock a door of the vehicle in response to the collision detection signal, and
   a wire harness that transmits the collision detection signal relayed by the emergency alert unit to the door lock control module extends along a side sill of the vehicle.

4. The vehicular emergency alert device of claim 1, wherein
   the emergency alert unit includes
   a micro-computer that controls an issue of the emergency alert signal and a relay of the collision detection signal, an input circuit that inputs the collision detection signal received from the collision detecting unit to the micro-computer, and an output circuit that drives a new collision detection signal for a relay output from the micro-computer and outputs the new collision detection signal out of the vehicle in accordance with a relay control signal output from the micro-computer.

5. The vehicular emergency alert device of claim 1, wherein the emergency alert unit includes a micro-computer that controls an issue of the emergency alert signal and an input circuit that inputs the collision detection signal received from the collision detecting unit to the micro-computer, and outputs the collision detection signal received from the collision detecting unit out of the vehicle as a collision detection signal for a relay without changing the collision detection signal.

6. The vehicular emergency alert device of claim 1, wherein the emergency alert unit includes a micro-computer that controls an issue of the emergency alert signal, an input circuit that inputs the collision detection signal received from the collision detecting unit to the micro-computer, and an output circuit that drives a new collision detection signal for a relay and outputs the new collision detection signal out of the vehicle in accordance with the collision detection signal received from the collision detecting unit.

7. The vehicular emergency alert device of claim 2, wherein the emergency alert unit includes a micro-computer that controls an issue of the emergency alert signal and a relay of the collision detection signal, an input circuit that inputs the collision detection signal received from the collision detecting unit to the micro-computer, and an output circuit that drives a new collision detection signal for a relay output from the micro-computer and outputs the new collision detection signal out of the vehicle in accordance with a relay control signal output from the micro-computer.

8. The vehicular emergency alert device of claim 3, wherein the emergency alert unit includes a micro-computer that controls an issue of the emergency alert signal and a relay of the collision detection signal, an input circuit that inputs the collision detection signal received from the collision detecting unit to the micro-computer, and an output circuit that drives a new collision detection signal for a relay output from the micro-computer and outputs the new collision detection signal out of the vehicle in accordance with a relay control signal output from the micro-computer.

9. The vehicular emergency alert device of claim 2, wherein the emergency alert unit includes a micro-computer that controls an issue of the emergency alert signal and an input circuit that inputs the collision detection signal received from the collision detecting unit to the micro-computer, and outputs the collision detection signal received from the collision detecting unit out of the vehicle as a collision detection signal for a relay without changing the collision detection signal.

10. The vehicular emergency alert device of claim 3, wherein the emergency alert unit includes a micro-computer that controls an issue of the emergency alert signal and an input circuit that inputs the collision detection signal received from the collision detecting unit to the micro-computer, and outputs the collision detection signal received from the collision detecting unit out of the vehicle as a collision detection signal for a relay without changing the collision detection signal.

11. The vehicular emergency alert device of claim 2, wherein the emergency alert unit includes a micro-computer that controls an issue of the emergency alert signal, an input circuit that inputs the collision detection signal received from the collision detecting unit to the micro-computer, and an output circuit that drives a new collision detection signal for a relay and outputs the new collision detection signal out of the vehicle in accordance with the collision detection signal received from the collision detecting unit.

12. The vehicular emergency alert device of claim 3, wherein the emergency alert unit includes a micro-computer that controls an issue of the emergency alert signal, an input circuit that inputs the collision detection signal received from the collision detecting unit to the micro-computer, and an output circuit that drives a new collision detection signal for a relay and outputs the new collision detection signal out of the vehicle in accordance with the collision detection signal received from the collision detecting unit.

* * * * *